Patented Aug. 17, 1948

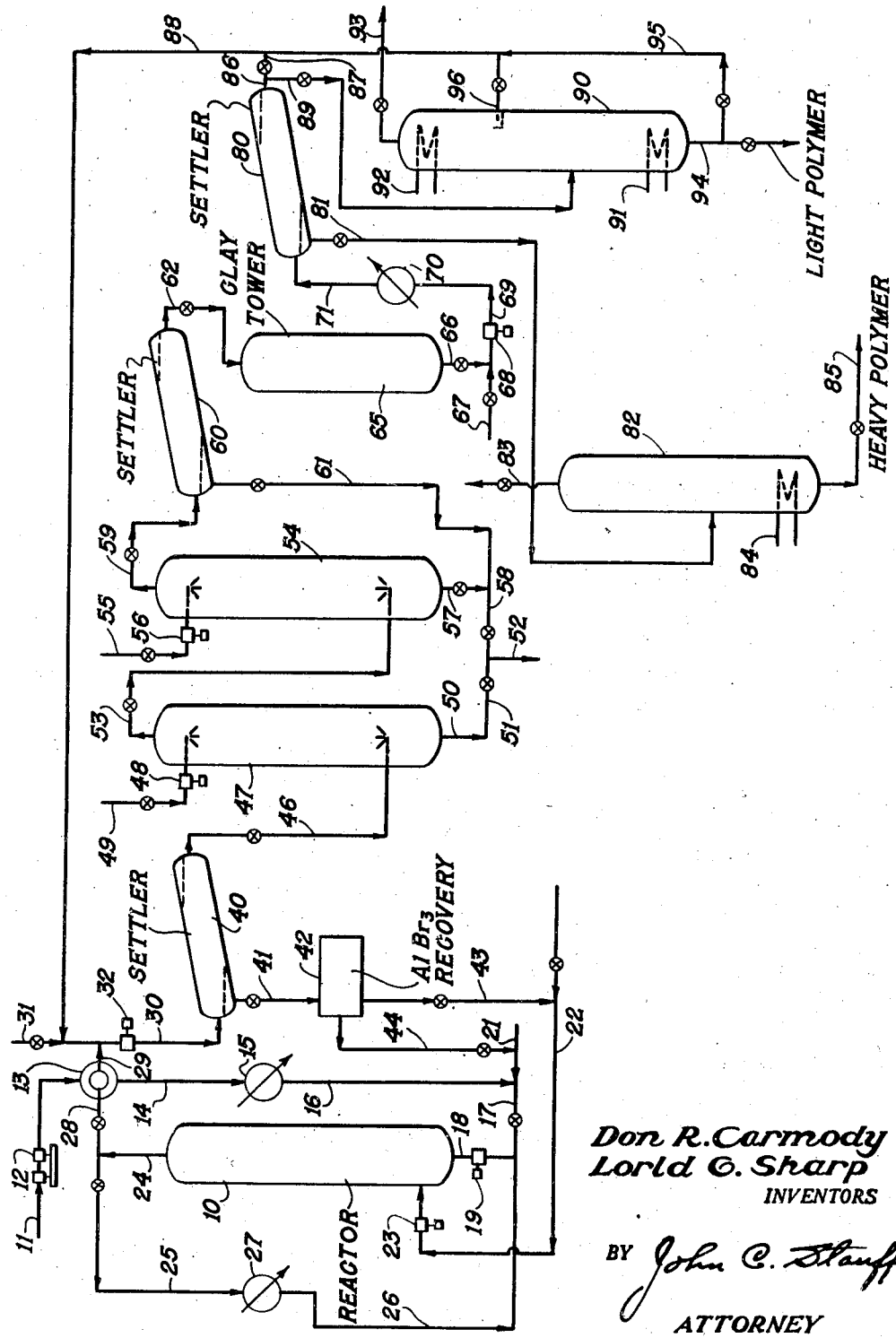

2,447,313

UNITED STATES PATENT OFFICE 2,447,313

POLYMERIZATION PROCESS

Don R. Carmody, Dallas, and Lorld G. Sharp, Irving, Tex., assignors, by mesne assignments, to Socony-Vacuum Oil Company, Incorporated, New York, N. Y., a corporation of New York Application October 19, 1946, Serial No. 704,396

10 Claims. (Cl. 260—683.15)

This invention relates to an improved process for the manufacture of polymers from terminal bond mono-olefins. More particularly, this invention is concerned with the aluminum bromide catalyzed liquid phase production of heavy polymers from such olefins as propylene and 1-butene in the presence of a diluent containing said catalyst dissolved therein.

It is known to polymerize propylene and/or butenes dissolved in hydrocarbon diluents in the presence of aluminum bromide. Thus, for example, in the production of polymers of propylene it is known to use as a source of olefin a refinery stream containing propane and propylene, the propane serving as a solvent for the catalyst. After the propylene in the $C_3$ hydrocarbon stream has been converted to polymer, the catalyst is removed from the reaction mixture. This is usually accomplished by raising the temperature of the reaction mixture sufficiently to convert the aluminum bromide to the insoluble aluminum bromide-hydrocarbon complex or by adding to the reactor effluent a material such as an aromatic compound with which a major part of the aluminum bromide forms an insoluble complex. The aluminum bromide can be recovered subsequently by heating the complex. The last traces of aluminum bromide catalyst are then removed by treating the effluent from which the catalyst has been partially removed with alcohol or water and/or by contacting with an absorbent solid such as clay.

The above methods for removing the major part of aluminum bromide from the reactor effluent are satisfactory when producing relatively light polymers. However, these methods are not applicable when manufacturing relatively heavy polymers. By heavy polymers we mean polymer product which has a viscosity of at least 500 S. U. S. at 210° F. These polymer products are characterized by being difficult to separate from dissolved aluminum bromide by simple heating of the effluent since much higher temperatures than atmospheric temperatures are required to form the insoluble aluminum bromide-hydrocarbon complex. Temperatures of the order of 250° F. to about 350° F. are required to precipitate the complex. If the effluent polymer is subjected to these relatively high temperatures in the presence of dissolved catalysts the heavy high molecular weight polymer is at least partially depolymerized. Likewise, it is undesirable to add a foreign material to the effluent since this contaminates the finished product and results in the production of a high polymer having undesirable physical properties such as poor color and inferior viscosity-temperature relationship.

The use of propane or butane as the catalyst solvent and as diluent also introduces a problem in processing the polymer product to obtain therefrom a fraction of very heavy polymer. Considerable difficulty is frequently encountered in stripping the diluent from the polymer due to excessive foaming, and unless extreme care is observed a part of the heavy polymer may pass overhead with the diluent as a result of entrainment. After the polymer has been freed of diluent it is then necessary to further strip the polymer with steam or under vacuum to obtain a product having the desired flash point characteristics. It is usually desirable to obtain a heavy polymer fraction having a flash point not less than 450° F. as determined by the Cleveland open cup method. This final stripping operation frequently discolors the polymer and cracking of the product may occur even in the substantial absence of catalyst and thereby cause the production of a finished product of decreased value.

It is an object of the present invention to provide a polymerization process wherein aluminum bromide catalyst may be removed from the heavy polymer reactor effluent in a form which permits the recovery of aluminum bromide. Another object of the invention is to provide a means for precipitating aluminum bromide as the aluminum-bromide-hydrocarbon complex from a reactor effluent mixture containing hydrocarbon diluent and heavy polymer. Still another object of the invention is to produce a heavy polymer of propylene without cracking the polymer in the catalyst removal operation. A further object is to fractionate a propylene polymer to obtain at least one high molecular weight, high viscosity polymer and at least one fraction of lower average molecular weight and lower viscosity than said high viscosity polymer without vaporizing part of said olefin polymer fraction in the fractionation process. Other objects will appear hereinafter from the description of the invention.

We have discovered that dissolved aluminum bromide can be precipitated from the relatively heavy propylene polymer effluent of the polymerization reactor at relatively low temperatures, that is, at temperatures of from about 70° F. to about 90° F. This may be accomplished by adding a light fraction of the polymer product to the effluent. As indicated hereinabove, aluminum bromide is precipitated quite readily from a hydrocarbon mixture containing a light hydrocarbon diluent and relatively low molecular weight polymer at moderate temperatures, that is, from about 70° F. to 90° F. The failure of the aluminum bromide to precipitate from such a mixture containing heavy polymer may be due to the failure of the aluminum bromide to combine with the heavy hydrocarbon polymer at low temperatures or to the relatively low number of olefinic linkages in the heavy polymer. In any case the addition of a low molecular weight fraction of the polymer product increases the concentration of olefinic linkages in the hydrocarbon product mixture and precipitation of the aluminum bromide in the form of aluminum bromide-hydrocarbon complex is thereby accomplished.

We have found that the hydrocarbon diluent, propane, may be made to serve a dual function in the preparation of heavy propylene polymer. The propane serves as diluent for the propylene and also as a precipitant to selectively precipitate heavy polymer in a fractionation of the whole polymer by differential precipitation. Thus, after removal of the aluminum bromide catalyst it is possible to precipitate heavy fractions of propylene polymer from a solution of the whole polymer in a diluent consisting of a normally gaseous hydrocarbon or a mixture of normally gaseous hydrocarbons by heating the solution to a temperature level of from about 60 Fahrenheit degrees to about 10 Fahrenheit degrees below the critical temperature or pseudo critical temperature of the diluent. By the term "pseudo critical temperature" we mean that temperature above which none of the mixture of components of the diluent will remain in the liquid state irrespective of the pressure applied. The temperature is calculated as the molal average of the critical temperatures of the components of the mixture. We may use as diluents methane, ethane, ethylene, propane, or normal butane. Single component diluents are limited to the latter four of these hydrocarbons. Pure methane is not suitable because of the extremely high pressure and low temperature necessary to maintain liquid phase conditions in the reaction zone if pure methane is used as diluent. Mixtures of two or more of these hydrocarbons may be liquefied, contacted with the soluble catalyst, and introduced to the polymerization zone into which propylene is introduced to produce polymers. We prefer to use a diluent consisting substantially of propane or a mixture of $C_2$ hydrocarbons and propane when manufacturing propylene polymer.

The polymerization is carried out at temperatures within the range of from about −110° to about +50° F. and at pressures sufficient to maintain the reactant and diluent in the liquid phase. The quantities of aluminum bromide to be dissolved in the diluent and the ratios of diluent to olefin in the reaction mixture may be those heretofore employed for the production of heavy propylene polymer. Hydrogen bromide catalyst activator may also be employed to assist the action of the aluminum bromide catalyst. The specific details with reference to the quantities of these materials to be employed form no part of the present invention, and for those interested in such details reference may be had to the following U. S. patents: Michel 1,822,358; Lyman et al. 2,216,372; Ried 2,355,925; Lieber et al. 2,379,728 and Hersberger 2,401,933.

According to our invention, the product effluent from the polymerization reactor is brought to a temperature within the range of from about 70° F. to about 90° F. and a light fraction of the polymer product obtained in a manner described hereinbelow is added to the effluent stream containing polymer, diluent and aluminum bromide catalyst in dissolved and suspended form. We prefer to add a polymer fraction of relatively low molecular weight since a higher concentration of olefinic linkages per unit weight of polymer is thereby obtainable. Thus, propylene dimer or trimer recycle is preferable to propylene tetramer, pentamer, or hexamer. However, the viscosity and molecular weight of the heavy polymer desired may determine the fraction of polymer recycle to the product stream. The product is passed to a settler for the separation of precipitated catalyst. If desired, the recycle fraction of light polymer may be added directly to the product in the settler.

After the polymer product has been freed of the major proportion of catalyst it is given alcohol and water washes and finally a clay treatment to remove traces of moisture, catalyst and/or catalyst activator. The ratio by weight of diluent to polymer in the clarified product is then adjusted to the range of from about 1:1 to about 20:1, preferably from about 4:1 to about 10:1 and the mixture of diluent and polymer is heated to a temperature within the range of from about 60 Fahrenheit degrees to about 10 Fahrenheit degrees below the critical temperature of the mixture of hydrocarbon diluents. The solution of polymer in diluent separates to form two phases, that is, a supernatant phase containing the major part of diluent and a light polymer fraction and a lower phase containing only a minor part of the diluent and a heavy polymer fraction.

The physical characteristics of the heavy polymer are determined by the temperature to which the solution of polymer has been raised and on the ratio of diluent to polymer in the mixture. Thus, in order to obtain a heavy polymer fraction containing only the highest molecular weight polymers, the temperature should be from 50 Fahrenheit degrees to 60 Fahrenheit degrees below the critical temperature of the diluent and the ratio of diluent to polymer in the mixture should be from about 15 mols to about 20 mols of diluent per mol of polymer. On the other hand, if it is desired to separate only the lightest polymer components of the polymer and thereby obtain a heavy polymer of only slightly higher molecular weight than the whole polymer product, the separation of the polymer into fractions is made at a relatively high temperature and low ratio of diluent to whole polymer. Following the heating step the two-phase system is separated and the polymer fractions are stripped of diluent. The heavy polymer is not subjected to a temperature above about 90° F. while in the presence of aluminum bromide catalyst or above about 350° F. in the differential fractionation and stripping steps of the process and hence the discoloration and depolymerization of the product is avoided. At least a part of the light polymer is recycled as such to the catalyst precipitation step either as such or after further fractionation to obtain the most desirable light polymer fraction for recycle such as the dimer and/or trimer fraction.

The invention will be better understood by reference to the drawing in which the single figure is a flow diagram of a preferred embodiment thereof.

Referring now to the drawing, vessel 10 is the reaction zone wherein propylene is converted to the polymerized product. Settler 40 is provided for the separation of insoluble aluminum bromide-hydrocarbon complex from the polymer product. Settler 60 is provided as a settling zone for the separation of residual wash water from the whole polymer product, and settler 80 serves as a separation zone for the two phases of fractionated polymer.

A $C_3$ hydrocarbon plant stream containing at least 55 per cent propane and at least 10 per cent and not more than 45 per cent propylene is introduced into the process through line 11 by means of compressor 12. The stream of compressed gas is passed through heat exchanger 13 wherein it is precooled by the cold effluent from reactor 10. The hydrocarbon stream passes via line 14 to condenser 15 where the stream is liquified. The liquid C₃ stream is passed to reactor 10 through lines 16, 17, and 18 by means of pump 19. The temperature of the hydrocarbon stream as it enters reactor 10 is within the range of from about −20° F. to about +30° F. The pressure maintained in reactor 10 is sufficient to maintain the reactants and diluents in the liquid phase, that is, from about 20 to about 100 pounds per square inch gage. Catalyst activator consisting of hydrogen bromide is introduced to line 17 through line 21.

Liquid propane diluent containing aluminum bromide catalyst dissolved therein is introduced to reactor 10 through line 22 by means of pump 23. Reactor 10 may be provided with inert packing material in order to obtain satisfactory mixing of the catalyst with the reaction mixture. Other means well known in the art may be used to obtain the desired distribution of catalyst and olefin with the diluent. Thus, reactor 10 may be equipped with a stirring device or the reactor may be equipped with baffles to obtain turbulence in the reactor. The temperature of the reaction mixture is maintained by circulating at least a part of the contents of the reactor through lines 24, 25, and 26 which joins line 18, and through cooler 27. The residence time of the reaction mixture in reactor 10 will vary within the range of from about 5 minutes to about 240 minutes in order to convert the propylene content of the reaction mixture completely to polymer.

The product mixture from reactor 10 is passed from line 24 through line 28 to heat exchanger 13 where the temperature is raised to about 75° F. or 80° F. and the liquid stream of the product passes thence through lines 29 and 30 to settler 40. Light propylene polymer reaction product, consisting substantially of propylene dimer, trimer, and/or tetramer is introduced to line 30 from line 31 by means of pump 32 in line 30. Contact of product solution of aluminum bromide catalyst with the light polymer causes the precipitation of the dissolved aluminum bromide in the form of insoluble aluminum bromide-hydrocarbon complex. The mixture separates in settler 40 to form a bottom layer of the complex upon which is superimposed the polymer product and diluent. The complex is withdrawn from settler 40 through line 41 and passes to the aluminum bromide recovery zone 42. Aluminum bromide is vaporized from the complex in zone 42 and is passed through line 43 to line 22 where it is incorporated in the propane diluent stream. Any hydrogen bromide formed in the aluminum bromide recovery zone is recycled through line 44 to line 21 for reuse in the process.

The solution of polymer in diluent passes from settler 40 through line 46 to a point near the bottom of tower 47 wherein the solution is contacted countercurrently with a stream of alcohol such as ethanol or propanol introduced to tower 47 by means of pump 48 in line 49. The alcohol removes substantially all of the residual dissolved aluminum bromide catalytic material as an aluminum bromide alcoholate. A part of the hydrogen bromide activator is also removed from the reaction mixture in tower 47. The alcohol solution of these materials passes from the bottom of tower 47 through lines 50, 51, and 52 to the alcohol and hydrogen bromide recovery zone (not shown). The washed product passes overhead from tower 47 through line 53 and is introduced at a low point into tower 54 wherein it is contacted countercurrently with water introduced to tower 54 from line 55 by means of pump 56. In tower 54 residual hydrogen bromide and alcohol are removed from the product. The aqueous solution passes from tower 54 through lines 57 and 58 to line 52 and thence to the alcohol and hydrogen bromide recovery zones. The washed mixture of diluent and polymer passes overhead from tower 54 through line 59 to settler 60. In settler 60 suspended water separates from the mixture and passes through lines 61, 58, and 52 to the alcohol and hydrogen bromide recovery zones. The clarified product passes from settler 60 through line 62 to clay contacting tower 65. In tower 65 traces of moisture, hydrogen bromide, and suspended hydrolyzed catalyst or dissolved catalyst are removed from the product. The purified product mixture is withdrawn from clay tower 65 through bottom drawoff line 66.

The weight ratio of diluent to polymer in the mixture withdrawn through line 66 is adjusted to the range of from about 1:1 to about 20:1 by adding diluent, which preferably consists substantially of propane or a mixture of C₂ hydrocarbons and propane, through line 67 to the solution of polymer in drawoff line 66 or excess diluent may be withdrawn from the product at this stage of the process by means of a flash tower (not shown). The solution containing the polymer in the hydrocarbon diluent is picked up by means of pump 68 in line 69 and is passed through heater 70 where the temperature of the stream is raised to a level within the range of from about 10 Fahrenheit degrees to about 60 Fahrenheit degrees below the critical temperature of the hydrocarbon diluent, that is, to the range of from about 145° F. to about 195° F. where propane is used as a diluent. From heater 70 the product passes through line 71 to settler 80.

As stated hereinabove, heating of the polymer in the presence of propane diluent, which also serves as a selective precipitant, causes the separation of the whole polymer into two fractions of polymer. Hence, the product forms two layers in settler 80 consisting of a layer of heavy polymer containing a relatively small amount of diluent and light polymer dissolved in the major part of the diluent. The heavy polymer phase is withdrawn from settler 80 through line 81 and passes to flash tower 82 wherein a pressure of about atmospheric to about 30 pounds per square inch gage is maintained. In tower 82 the small amount of propane diluent is removed from the heavy polymer and passes from the tower through line 83. The heavy polymer in tower 82 is heated to a temperature not exceeding 300° F. by means of coil 84. The finished heavy polymer is withdrawn from tower 82 through bottom drawoff line 85.

Returning now to settler 80, the upper phase of the product is withdrawn through line 86. If desired, a part of this solution of light polymer in diluent may be recycled directly without fractionation through lines 87 and 88 to line 31 and thence by line 30 to catalyst settler 40. However, we prefer to remove the diluent and fractionate the light polymer prior to recycle of light polymer precipitant. This is accomplished by passing the solution of light polymer through line 89 to fractionator 90 which is provided with bottom heating means 91 and reflux means 92.

Propane diluent passes overhead from fractionator 90 through line 93 and diluent-free light polymer is withdrawn through bottom drawoff line 94. If desired, at least part of this light polymer may be recycled via lines 95, 88, 31, and 30 to settler 40 to serve as precipitant for aluminum bromide catalyst dissolved in the whole polymer product. This type of operation is desirable where the major part of the light polymer fraction consists of a major proportion of propylene dimer, trimer, and tetramer, that is, where the temperature to which the mixture of propane diluent and whole polymer from line 69 is raised in heater 70 only a few degrees below the critical temperature of the propane and the ratio of the propane to dissolved whole polymer is relatively high. In general, we prefer to fractionate the light polymer and withdraw from fractionator 90 a side stream consisting substantially of propylene dimer and/or trimer, and/or tetramer. This side stream is recycled via lines 96, 95, 88, 31, and 30 to settler 40 to bring about the maximum degree of separation of recoverable aluminum bromide catalyst from the whole polymer product.

While the present invention has been explained with respect to one specific embodiment, as set out in the drawing and described in detail in a process for the polymerization of propylene in the presence of propane diluent, it will be appreciated that the principle of contacting recycle, relatively low molecular weight polymer, such as dimer, trimer, or tetramer, with the whole polymer effluent may be applied to any polymerization process which utilizes hydrocarbon-soluble aluminum bromide catalyst. Our process is particularly advantageous since it uses a part of the least valuable fraction of the product as a precipitant for the aluminum bromide catalyst. If the light fraction of the polymer is used, contamination of the whole polymer with an extraneous precipitant is avoided. Our process is also advantageous in that we may use a differential precipitation method of fractionation to separate the heavy polymer from the light polymer product. Thus, we are able to obtain a light polymer precipitant for the catalyst and at the same time protect the relatively high molecular weight polymer against (1) depolymerization and consequent impairment of color and flash point characteristics, and (2) contamination with foreign precipitant material.

We claim:

1. A liquid phase process for the production of heavy polymer from at least one terminal bond mono-olefin containing not more than 4 carbon atoms per molecule in the presence of aluminum bromide catalyst and in the presence of a diluent consisting substantially of at least one non-reactive aliphatic hydrocarbon having not more than 4 carbon atoms per molecule which process comprises the steps of (1) contacting a liquid stream of normally gaseous hydrocarbons comprising said mono-olefin with a solution of said aluminum bromide in said diluent for sufficient time to react substantially all of said olefin to form polymers therefrom, (2) contacting the reaction mixture obtained in step 1 with a light fraction of the polymer product obtained as described hereinafter to precipitate the major portion of the dissolved aluminum bromide in the form of aluminum bromide-hydrocarbon complex, (3) separating the aluminum bromide-hydrocarbon complex obtained in step 2 from the product mixture, (4) raising the temperature of the product mixture of olefin polymer and diluent obtained from step 3 to a level within the range of from about 60 Fahrenheit degrees to about 10 Fahrenheit degrees below the critical temperature of said diluent whereby said mixture is caused to separate into two phases consisting of a relatively heavy polymer with diluent and a relatively light polymer with diluent, (5) separating the hydrocarbon phases obtained in step 4, (6) separating diluent from the separate phases obtained in step 5 to obtain separate streams of relatively heavy olefin polymer and relatively light olefin polymer, (7) recycling at least a part of the relatively light olefin polymer obtained in step 6 to step 2 of the process, and (8) recovering relatively heavy mono-olefin polymer from step 6 of the process.

2. The process as described in claim 1 wherein the mono-olefin is propylene.

3. A liquid phase process for the production of heavy polymer from at least one terminal bond mono-olefin containing not more than 4 carbon atoms per molecule in the presence of aluminum bromide catalyst and in the presence of a diluent consisting substantially of at least one non-reactive aliphatic hydrocarbon having not more than 4 carbon atoms per molecule which process comprises the steps of (1) contacting a liquid stream of normally gaseous hydrocarbons comprising said mono-olefin with a solution of said aluminum bromide in said diluent for sufficient time to react substantially all of said olefin to form polymers therefrom, (2) contacting the reaction mixture obtained in step 1 with a light fraction of the polymer product obtained as described hereinafter to precipitate the major portion of the dissolved aluminum bromide in the form of aluminum bromide-hydrocarbon complex, (3) separating the aluminum bromide-hydrocarbon complex obtained in step 2 from the product mixture, (4) adjusting the weight ratio of diluent to polymer to a value within the range of from 1 to 1 to 20 to 1, (5) raising the temperature of the product mixture of olefin polymer and diluent obtained from step 4 to a level within the range of from about 60 Fahrenheit degrees to about 10 Fahrenheit degrees below the critical temperature of said diluent whereby said mixture is caused to separate into two phases consisting of a relatively heavy polymer with diluent and a relatively light polymer with diluent, (6) separating the hydrocarbon phases obtained in step 5, (7) separating diluent from the separate phases obtained in step 6 to obtain separate streams of relatively heavy olefin polymer and relatively light olefin polymer, (8) recycling at least a part of the relatively light olefin polymer obtained in step 7 to step 2 of the process, and (9) recovering relatively heavy mono-olefin polymer from step 7 of the process.

4. The liquid phase process for the manufacture of a heavy propylene polymer which comprises the steps of (1) contacting liquid propylene in a reactor with aluminum bromide catalyst in the presence of from one to twenty mols of propane diluent per mol of propylene in said reaction zone for sufficient time to convert substantially all of said propylene to propylene polymer product, (2) passing the reactor effluent obtained from step 1 in contact with a light fraction of polymer product obtained by fractionating the polymer product as described hereinafter, whereby the major portion of the aluminum bromide dissolved in the reactor effluent is precipitated in the form of aluminum bromide-hydrocarbon complex, (3) separating the aluminum bromide complex obtained in step 2 from the product mixture, (4) raising the temperature of the product mixture of propylene polymer and diluent obtained from step 3 to a temperature within the range of from about 145° F. to about 195° F. whereby the product mixture is caused to separate into two phases consisting of a relatively heavy polymer phase with diluent and consisting of relatively light polymer phase with diluent, (5) separating the phases obtained in step 4, (6) separating diluent from the separate phases obtained in step 5 to obtain separate streams of relatively heavy propylene polymer and relatively light propylene polymer, (7) recycling at least a part of the relatively light propylene polymer obtained in step 6 to step 2 of the process to precipitate aluminum bromide-hydrocarbon complex from the product mixture, and (8) recovering heavy propylene polymer from step 6 of the process.

5. The process as described in claim 4 wherein contact of the reactor effluent with the light fraction of the polymer product is made at a temperature within the range of from about 70° F. to about 90° F.

6. The process as described in claim 4 wherein the light propylene polymer obtained from step 6 is fractionated to obtain a product containing propylene dimer and propylene trimer and wherein said dimer and trimer are recycled as per step 7 of the process to step 2 of the process.

7. A liquid phase process for the manufacture of a heavy propylene polymer which comprises the steps of (1) contacting in a reactor a liquified normally gaseous hydrocarbon stream containing propylene and at least one normally gaseous saturated hydrocarbon having not more than 4 carbon atoms per molecule with aluminum bromide catalyst dissolved in said stream for sufficient time to convert substantially all of said propylene to propylene polymer, (2) passing the reactor effluent obtained from step 1 in contact with a light fraction of the polymer component of said effluent obtained by fractionating the reactor effluent as described hereinafter, whereby the major portion of the aluminum bromide dissolved in the reactor effluent is precipitated in the form of aluminum bromide-hydrocarbon complex, (3) separating the aluminum bromide complex obtained in step 2 from the product mixture, (4) raising the temperature of the product mixture of propylene polymer and unreacted hydrocarbons obtained from step 3 to a temperature within the range of from about 145° F. to about 195° F., whereby the product mixture is caused to separate into two phases consisting of a relatively heavy polymer phase and a relatively light polymer phase, (5) separating the phases obtained in step 4, (6) separating unreacted hydrocarbons from the polymer in the separate phases obtained in step 5 to obtain separate streams of relatively heavy propylene polymer and relatively light propylene polymer, (7) recyling at least a part of the light propylene polymer obtained in step 6 to step 2 of the process to precipitate aluminum bromide-hydrocarbon complex from the product mixture, and (8) recovering heavy propylene polymer from step 6 of the process.

8. The liquid phase process for the manufacture of heavy propylene polymer which comprises the steps of (1) contacting in a reactor a liquified normally gaseous hydrocarbon stream containing propylene and at least one normally gaseous saturated hydrocarbon having not more than 4 carbon atoms per molecule with aluminum bromide catalyst for sufficient time to convert substantially all of the said propylene to propylene polymer, (2) passing the reactor effluent obtained from step 1 in contact with a light fraction of the polymer product obtained by fractionating the reactor effluent as described hereinafter, whereby the major portion of the aluminum bromide dissolved in the reactor effluent is precipitated in the form of aluminum bromide-hydrocarbon complex, (3) separating the aluminum bromide complex obtained in step 2 from the product mixture, (4) adjusting the ratio by weight of the normally gaseous paraffinic hydrocarbons to polymer in the polymer product to a value within the range of from about 1:1 to about 20:1, (5) raising the temperature of the product mixture of propylene polymer and paraffinic hydrocarbons obtained from step 4 to a temperature within the range of from about 145° F. to about 195° F. whereby the product mixture is caused to separate into two phases consisting of a relatively heavy polymer-containing phase and a relatively light polymer-containing phase, (6) separating the phases obtained in step 5, (7) separating propylene polymer from the separate phases obtained in step 6 to obtain separate streams of relatively heavy propylene and relatively light propylene polymer, (8) recycling at least a part of the light propylene polymer obtained in step 7 to step 2 of the process to precipitate aluminum bromide-hydrocarbon complex from the product mixture, and (9) recovering heavy propylene polymer from step 7 of the process.

9. In a liquid phase process for the manufacture of heavy polymer from at least one mono-olefin in a reaction zone in the presence of a diluent consisting substantially of at least one non-reactive aliphatic hydrocarbon having not more than 4 carbon atoms per molecule and in the presence of aluminum bromide dissolved in the mixture of mono-olfin and diluent wherein a reaction zone effluent consisting of a solution of a mixture of light and heavy polymer and aluminum bromide catalyst in said diluent is produced the improvement which comprises recycling to said effluent at least a part of the light polymer fractionated from said polymer mixture to precipitate therefrom said aluminum bromide catalyst.

10. In a liquid phase process for the manufacture of heavy polymer from at least one mono-olefin in a reaction zone in the presence of a diluent consisting substantially of at least one non-reactive aliphatic hydrocarbon having not more than 4 carbon atoms per molecule and in the presence of aluminum bromide dissolved in the mixture of mono-olefin and diluent wherein a reaction zone effluent consisting of a solution of a mixture of light and heavy polymer and aluminum bromide catalyst in said diluent is produced at a polymerization temperature within the range of from about −110° F. to about +50° F. the improvement which comprises raising the temperature of said effluent to a level within the range of from about 70° F. to about 90° F. and recycling to said effluent at least a part of the light polymer fractionated from said polymer mixture to precipitate therefrom said aluminum bromide catalyst.

DON R. CARMODY.
LORLD G. SHARP.

REFERENCES CITED

The following references are of record in the file of this patent:

UNITED STATES PATENTS

| Number | Name | Date |
|---|---|---|
| 2,395,022 | Sutton | Feb. 19, 1946 |
| 2,401,933 | Hersberger | June 11, 1946 |